United States Patent [19]
Elwin et al.

[11] Patent Number: 6,148,210
[45] Date of Patent: Nov. 14, 2000

[54] PERSONAL COMMUNICATION SYSTEM AND TECHNIQUE WITH ZONE REPORT FEATURE

[75] Inventors: Randolph G. Elwin, Cardiff by the Sea; Greg Elmassian, Carlsbad, both of Calif.

[73] Assignee: Denso Corporation, Kariya, Japan

[21] Appl. No.: 09/444,393

[22] Filed: Nov. 22, 1999

Related U.S. Application Data

[63] Continuation-in-part of application No. 08/814,904, Mar. 12, 1997.

[51] Int. Cl.[7] .................................................. H04Q 7/32
[52] U.S. Cl. ............................ 455/453; 455/450; 455/452
[58] Field of Search ..................................... 455/453, 404, 455/405, 422, 432, 434, 439, 513, 515, 524, 525, 31.2, 32.1, 446, 518, 519, 450, 452, 447, 522; 370/322, 335, 320, 330

[56] References Cited

U.S. PATENT DOCUMENTS

| 4,144,496 | 3/1979 | Cunningham et al. ................. 455/447 |
| 4,149,144 | 4/1979 | Diefenderfer . |
| 4,670,899 | 6/1987 | Brody et al. . |
| 4,974,256 | 11/1990 | Cyr et al. . |
| 5,101,407 | 3/1992 | Harvey et al. .......................... 455/519 |
| 5,276,907 | 1/1994 | Meidan . |
| 5,280,630 | 1/1994 | Wang . |
| 5,371,780 | 12/1994 | Amitay . |
| 5,379,448 | 1/1995 | Ames et al. . |
| 5,596,625 | 1/1997 | LeBlanc ................................ 455/404 |
| 5,628,052 | 5/1997 | DeSantis et al. . |
| 5,633,915 | 5/1997 | Yang et al. . |
| 5,754,959 | 5/1998 | Ueno et al. . |
| 5,850,611 | 12/1998 | Krebs . |
| 5,901,358 | 5/1999 | Petty et al. . |
| 5,933,777 | 8/1999 | Rahman ................................. 455/450 |
| 5,970,417 | 10/1999 | Toyryla et al. ........................ 455/519 |

FOREIGN PATENT DOCUMENTS 59-85149   5/1984   Japan .

OTHER PUBLICATIONS

Yum et al: "Hot–Spot Traffic Relief in Cellular System" Journal on Selected Areas in Communication, pp. 934–939.

Primary Examiner—Dwayne D. Bost
Assistant Examiner—Jean A. Gelin
Attorney, Agent, or Firm—Pillsbury Madison & Sutro LLP

[57] ABSTRACT

In a distributed communication system such as a personal handyphone system, when a new call must be connected through a cell station, the controller associated with the cell station checks to see if the cell station is fully loaded. If so, the controller issues a zone report request to portable telephones currently having calls connected through that cell station, and the telephones check to see if they can reconnect to a different cell station. The phones then issue a zone report to the controller indicating whether or not they are reconnectable, and one or more of the phones are directed to reconnect based on information contained in the zone reports. Consequently, a space on the target cell station is freed so that the new call can be connected. This technique is useful for incoming calls from a wireline network, outgoing calls from a portable telephone, and handoffs of a roaming portable telephone, and can also be used in an overall cell station loading management scheme.

28 Claims, 10 Drawing Sheets

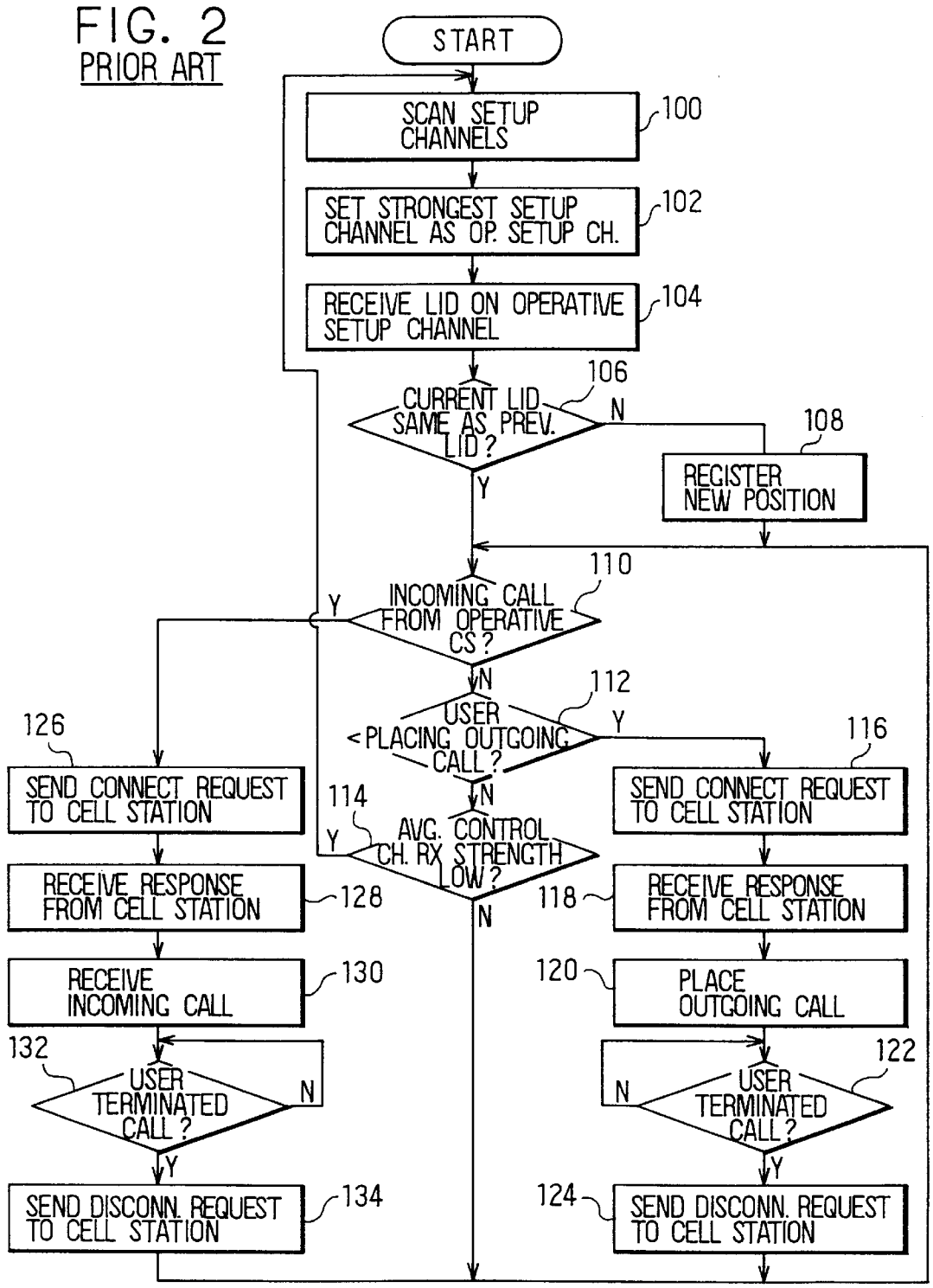

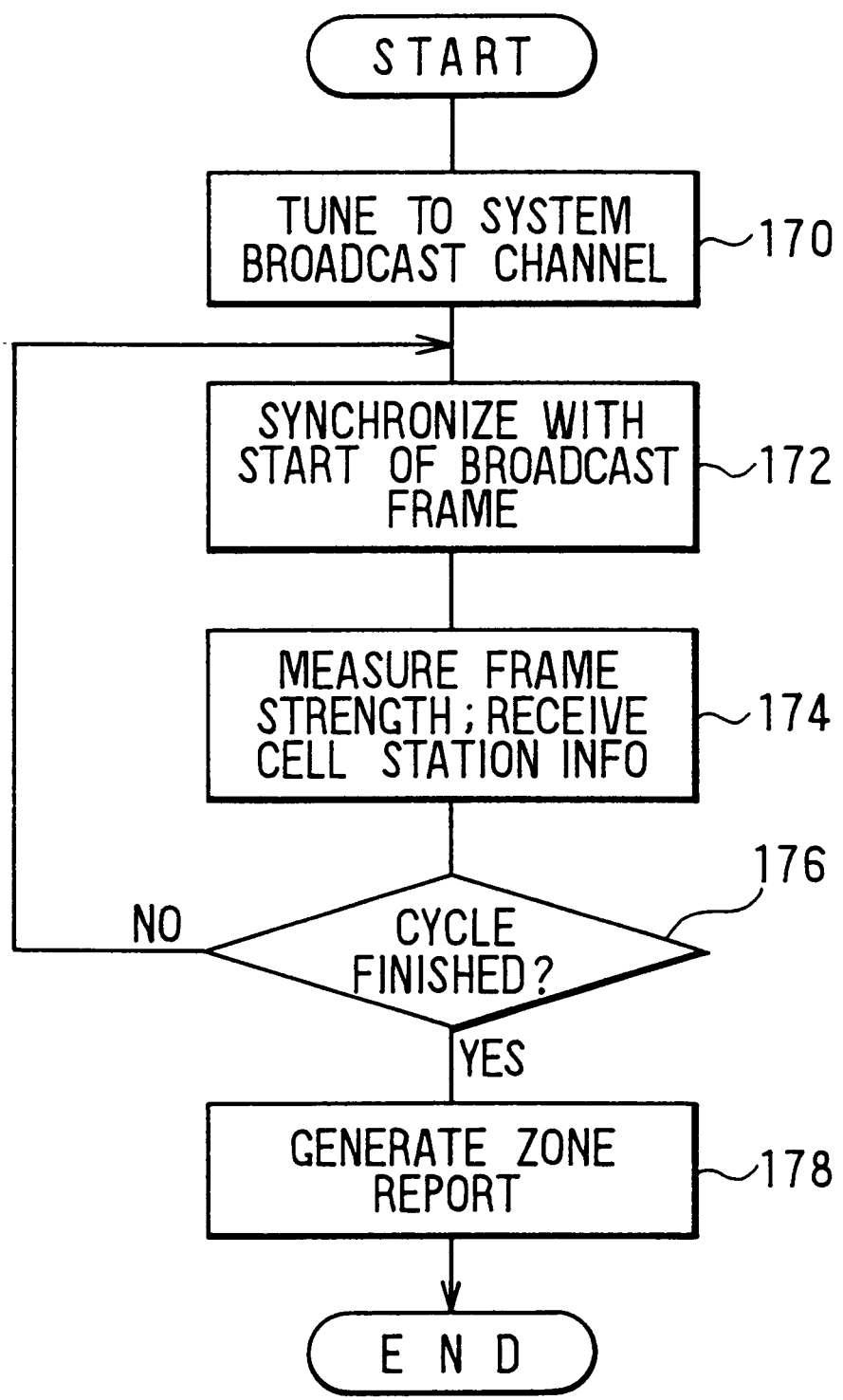

PERSONAL COMMUNICATION SYSTEM AND TECHNIQUE WITH ZONE REPORT FEATURE

CROSS-REFERENCE TO RELATED APPLICATION

This application is a continuation-in-part of U.S. patent application Ser. No. 08/814,904, filed Mar. 12, 1997.

BACKGROUND OF THE INVENTION

1. Field of the Invention

The present invention is related to paging in distributed communications systems, and, more particularly, to techniques and systems for paging in portable personal communications systems characterized by a limited number of communication channels between mobile and base units, such as personal handyphone (PHS) and micro-cellular systems.

2. Description of Related Art

Portable personal communication systems have enjoyed a dramatic increase in popularity in recent years, and the trend is sure to continue. With their ability to place conventional telephone calls from virtually anywhere in a geographically diverse environment, their high quality of service and their compact size, such systems provide users with convenience, flexibility and ease of use unparalleled by other communication systems.

Portable personal telephone networks such as the one shown in FIG. 1 typically include three main parts: a number of portable telephones 10 (hereinafter "Personal Communication System" or "PCS units"), several cell stations 12 each disposed within a respective coverage zone 14, and a PCS network controller 16 (hereinafter "PNC"). The PCS units 10 communicate exclusively with the cell stations 12, and the cell stations 12 communicate with the PCS units 10 and the PNC 16.

The Federal Communications Commission (hereinafter "FCC") has allocated 666 RF channels for communications between PCS units 10 and cell stations 12. Of these channels, 312 in each band are used for voice and data transmission (hereinafter, these channels will simply be called "voice channels") and the remaining 21 are reserved for use as setup channels, the significance of which will be described below.

In practice, a multiplexing technique is used so that each RF channel can be used to service three PCS units 10 simultaneously; however, in the following discussion, for simplicity it will be assumed that each RF channel is dedicated to a single PCS unit 10.

One of the biggest advantages of PHS systems is their relatively inexpensive parts and their consequent low cost. Thus, it is advantageous for the cell stations to handle as few channels as possible, since the cost and complexity of a cell station increases with the number of channels it services.

The PNC 16 is the system's link to the conventional telephone network. When a PCS unit 10 originates or receives a call, a radio link is established between the PCS unit 10 and the cell station 12, and a data link (typically an ISDN connection) is established between the cell station 12 and the PNC 16. In this way, the PNC 16 establishes a path between the PCS 10 and the conventional wireline telephone network.

The process of establishing a call with a PCS unit 10 will now be described in detail. When the PCS unit 10 is turned on, it scans a group of setup channels whose frequencies have previously been stored in its memory and selects the RF channel corresponding to the best signal (e.g., the strongest signal) as shown in Step 100 of FIG. 2. It sets this RF channel as its operative setup channel in Step 102, receives a local identification code (hereinafter "LID") periodically sent by the cell station 12 transmitting on the operative setup channel in Step 104, and compares that LID to the LID of its last known position in Step 106.

If the two LIDs are different, the PCS unit 10 determines that it has moved to a new area since its last position registration and proceeds to register its new position with the current cell station 12 via the operative setup channel in Step 108. If the two LIDs are identical, the system loops through Steps 110 and 112 to wait for an incoming call from the registered cell station 10 (also known as paging) in Step 110 or for the user to place an outgoing call (also known as access) in Step 112. While waiting to execute the paging and access procedures, the PCS unit 10 checks to see if the signal from the operative setup channel has fallen below a predetermined threshold in Step 114 and if so, the PSC unit 10 executes the scanning procedure of Steps 100–104 again to establish a new operative setup channel.

When a user attempts to initiate access and place an outgoing call from the PCS unit 10, the PCS unit 10 sends a connection request signal, including the telephone number to be called, asking for a connection on a free voice channel to the operative cell station 12 as shown in Step 116. The cell station 12 sends a response signal notifying the PCS unit 10 of the assigned voice channel which is received by the PCS unit 10 in Step 118, the cell station establishes an ISDN link with the PNC 16 to connect to the wireline telephone network, and the call begins. The PCS unit 10 then places the outgoing call with the cell station 12 in Step 120 and loops through Step 122 waiting for the user to terminate the call, and at that point sends a disconnection request signal to the cell station 12 to free the allocated voice channel in Step 124 and returns to the paging-access loop of Steps 110 and 112.

In the complementary paging process, when the PNC 16 receives a call destined for a PCS unit 10 from the wireline telephone network, it sends a paging message containing the called number to all of its cell stations 12, and each cell station 12 broadcasts the called number on all of its setup channels. Since the PCS unit 10 is monitoring the operative setup channel, it recognizes its number in Step 110 and sends a connection request signal to the cell station 12 in Step 126. Then, the PCS unit 10 receives a response signal notifying the PCS unit 10 of the assigned voice channel in Step 128, receives the incoming call on the assigned voice channel in Step 130, loops through Step 132 waiting for the user to terminate the call, and sends a disconnection request signal in Step 134 as in the case of the access process described above.

One other connection procedure, "handing off", is essential to PHS operation. As noted above, if while waiting for a paging or access procedure a PCS unit 10 determines that the signal strength of its operative setup channel has fallen to an unacceptably low level, it will scan the setup channels to find a better one. However, while a call is in progress, the cell station 12 may determine that the setup channel signal from the PCS unit 10 has fallen to an unacceptably low level. This is most often the result of movement of the PCS unit 10 away from the operative cell station 12, i.e., "roaming". In this case, the cell station 12 will notify the PNC 16 of the deterioration of the signal from the PCS unit 10.

The PNC 16 then sends a monitor request signal to other cell stations 12 adjacent to the operative cell station 12 instructing them to assess the strength of the setup channel signal from the PCS unit 10. The other cell stations 12 report their results, and the PNC 16 sends a command to the PCS unit 10 via the operative cell station 12 instructing it to make the other cell station 12 having the highest received signal strength its new operative cell station and to switch its voice channel accordingly.

The above system works well; however, it has practical disadvantages. For example, as noted above, it is advantageous for cell stations to use as few RF channels as possible. However, reducing the number of cell station channels increases the likelihood of call blocking, i.e., a situation where a PCS unit 10 attempting access to a cell station 12 or where a cell station 12 attempting to page a PCS unit 10 finds all voice channels occupied. If an access operation from a PCS unit 10 or a paging operation from a cell station 12 is blocked and the PCS unit 10 is not within the coverage zone of another cell station 12 which has a free channel, the call will be lost. Of course, this reduces the grade of service of the system, and most PHS systems attempt to keep the proportion of blocked calls during their busy hours under 1%.

FIGS. 3 and 4 show examples of call blocking in prior art systems. A paging group coverage area 18 is formed by respective individual coverage areas 20a, 20b and 20c of cell stations 12a, 12b and 12c in FIG. 3. Calls are established between PCS units 10a–10c and cell station 12a; thus, cell station 12a is fully loaded (in this Figure, light arrows from a PCS unit to a cell station indicate a PCS unit registration, while heavy arrows from a cell station to a PCS unit indicate a connected call). Further, a call is established between PCS unit 10d and cell station 12b, and PCS unit 10e makes a request to place an outgoing call with cell station 12a. FIG. 4 shows a similar situation in which a call between PCS unit 10e and cell station 12b has previously been established; however, PCS unit 10e has roamed from the coverage area 20b to the coverage area 20a, and it requests that its call be handed off to cell station 12a.

In either situation, the call from PCS unit 10e will be blocked because cell station 12a is fully loaded. One way to avoid this problem while keeping the number of channels on each cell station 12 low is to add additional cell stations; however, this is expensive and there is a practical limit on how many cell stations can be placed in close proximity to one another while maintaining adequate frequency reuse conditions.

SUMMARY OF THE INVENTION

In view of the above-described problems of the prior art, one object of the present invention is to provide a technique for paging in distributed communication systems such as PHS systems which has a low percentage of blocked calls.

A further object of the present invention is to provide a distributed communication system paging technique which provides a high grade of service with cell stations having a small number of channels.

Another object of the present invention is to provide a distributed communication system and technique which provide a high grade of service with a small number of cell stations.

A still further object of the present invention is to provide a distributed communication system and technique which use a personal communication system network controller to monitor cell station loading and to direct calls with personal communication system units to selected cell stations by requesting zone reports from the units, in response to a link trying to be established with a fully loaded cell station, in order to minimize call blocking.

Still another object of the present invention is to provide a distributed communication system and technique which minimize the blocking of outgoing calls from a personal communication system unit and which minimizes the blocking of incoming calls to a personal communication system unit.

A yet further object of the present invention is to provide a distributed communication system and technique which minimize call blocking when a call with a roaming personal communication system traversing cell station coverage boundaries is handed off.

Another object of the present invention is to provide a call management system in which personal communication systems are handed off from fully loaded cell stations to cells stations that are not fully loaded in order to maintain an optimum cell station loading distribution within a particular communication zone.

The above objects are achieved by providing a personal communication system in which, when a new call must be connected through a cell station, the PCS unit associated with the cell station checks to see if the cell station is fully loaded. If so, a system controller sends a zone report request to portable telephones currently having calls connected through that cell station to see if any of the units can reconnect to a different cell station. Each of the units then checks its reconnectability with other cell stations within the particular communication zone and issues a zone report to the controller regarding same. The controller then determines if one of the units can be reconnected, and, if so, causes a unit to be handed off, thereby freeing a space on the target cell station so that the new call can be connected. This technique may be used for incoming calls from a wireline network, outgoing calls from a portable telephone, and handoffs of a roaming portable telephone. Further, the controller/portable telephone-based zone reporting feature of the present invention can also be used in an overall cell station loading management scheme.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which:

FIG. 2 is a flowchart showing the handling of incoming and outgoing calls in a personal communication system unit according to the prior art;

FIG. 9 is a flowchart illustrating the methodology associated with the PCS unit zone reporting feature of the preferred embodiment;

DETAILED DESCRIPTION OF THE PREFERRED EXEMPLARY EMBODIMENTS

Figure 5:
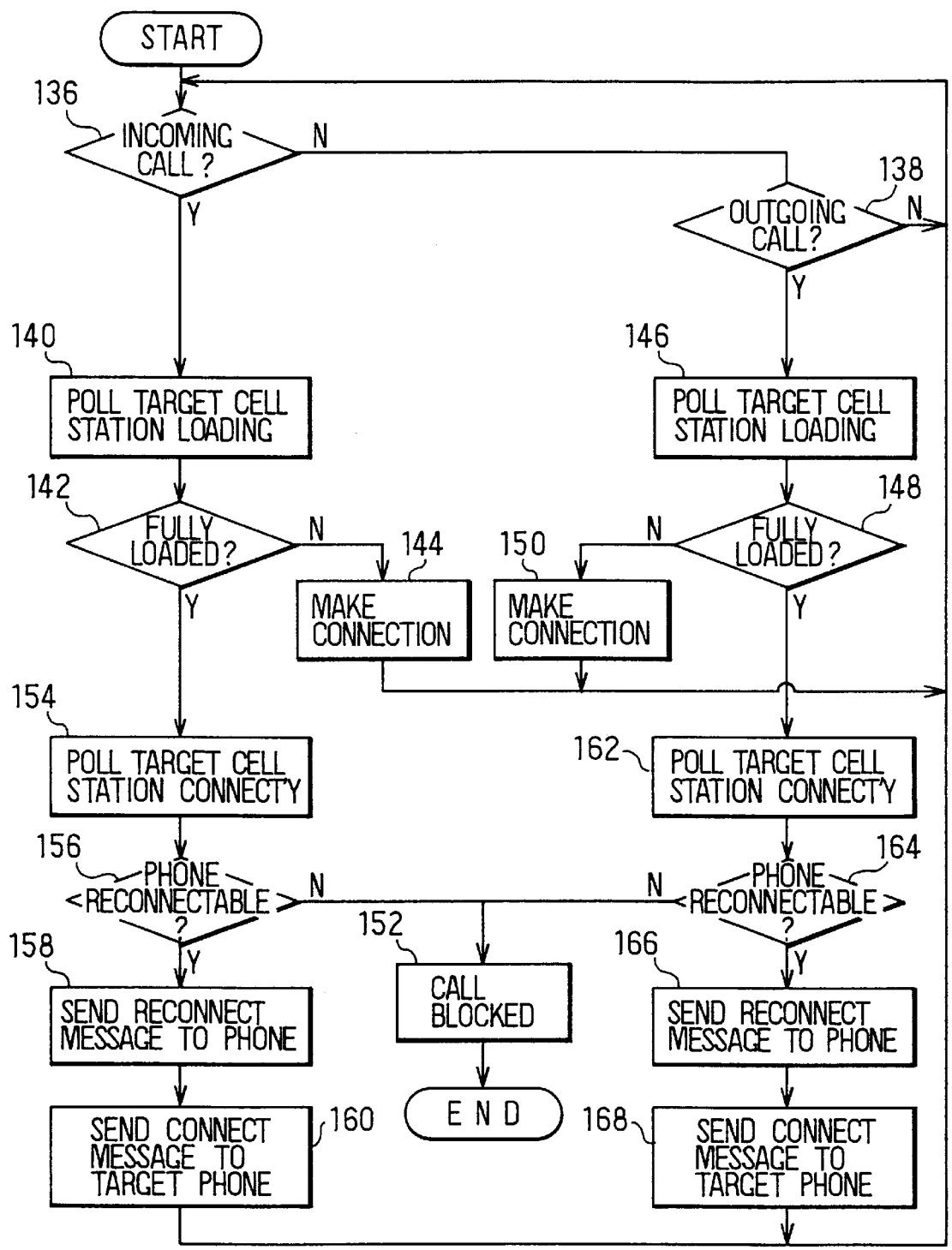
FIG. 5 is a flowchart showing the processing in a PCS network controller according to a preferred embodiment of the present invention.

FIG. 5 is a flowchart showing the processing in a PCS network controller (PNC) performing a portable telephone paging technique according to a preferred embodiment of the present invention. It is well-known in the art that PNCs are usually controlled by one or more microprocessors, and this technique is preferably implemented as a program in such a microprocessor or microprocessors.

The PNC cycles through a wait loop formed by Steps 136 and 138 waiting for a telephone call transaction. When the PNC determines that it has received an incoming call from the wireline network in Step 136, it sends a loading poll command signal to the cell station where the PCS unit to which the incoming call is directed has registered in Step 140, and in Step 142 the PNC determines whether the cell station's response indicates that it is fully loaded (remember that control operations are performed using the setup channels separate from the voice channels, and such polling may therefore be performed even with a cell station whose voice channels are fully loaded). If the cell station is not fully loaded, the PNC proceeds to make the connection with the PCS unit to establish a telephone session in Step 144.

Similarly, when the PCS determines that it has received a request to make an outgoing call to the wireline network from a PCS unit in Step 138, it sends a loading poll command signal to the cell station where the PCS unit from which the outgoing call request was made has registered in Step 146, and in Step 148 the PNC determines whether the cell station's response indicates that it is fully loaded. If the cell station is not fully loaded, the PNC proceeds to connect the PCS unit to the wireline network to establish a telephone session in Step 150.

The processing described so far is substantially the same as in prior art systems. However, in the prior art, if the PNC determines that the relevant cell station is fully loaded in Step 142 or Step 148, it simply goes to Step 152 and determines that the call is blocked, thereby presenting the caller (the wireline subscriber for an incoming call or the PCS unit user for an outgoing call) with a denial of service. In contrast, this embodiment of the present invention makes additional efforts to establish the call.

More specifically, if the PNC determines that the cell station is fully loaded in the case of an incoming call, it sends a connectivity poll command to all other PCS units currently connected to the fully-loaded cell station in Step 154 and in Step 156 determines whether one of these other PCS units can reconnect from its current cell station to a different cell station. If one of the other PCS units indicates that it is reconnectable, the PNC sends a reconnect command to it via its current cell station in Step 158, thereby freeing up a voice channel on the cell station currently associated with the target PCS unit. Finally, in Step 160, the PNC unit connects the incoming call from the wireline network to the target PCS unit, thereby establishing a telephone session. Only when the PNS determines in Step 164 that no other PCS unit connected to the cell station is reconnectable does it give up and go to Step 152 to declare that the call is blocked.

Similarly, if the PNC determines that the cell station is fully loaded in the case of an outgoing call, it sends a connectivity poll command to all other PCS unit currently connected to the fully-loaded cell station in Step 162 and in Step 164 determines whether one of these other PCS units can reconnect from its current cell station to a different cell station. If one of the other PCS units indicates that it is reconnectable, the PNC sends a reconnect command to it via its current cell station in Step 166, thereby freeing up a voice channel on the cell station currently associated with the target PCS unit. Finally, in Step 168, the PNC unit connects the incoming call from the wireline network to the target PCS unit, thereby establishing a telephone session. On the other hand, if the PNC determines in Step 164 that no other PCS unit connected to the cell station is reconnectable, it goes to Step 152 to declare that the call is blocked.

Figure 1:
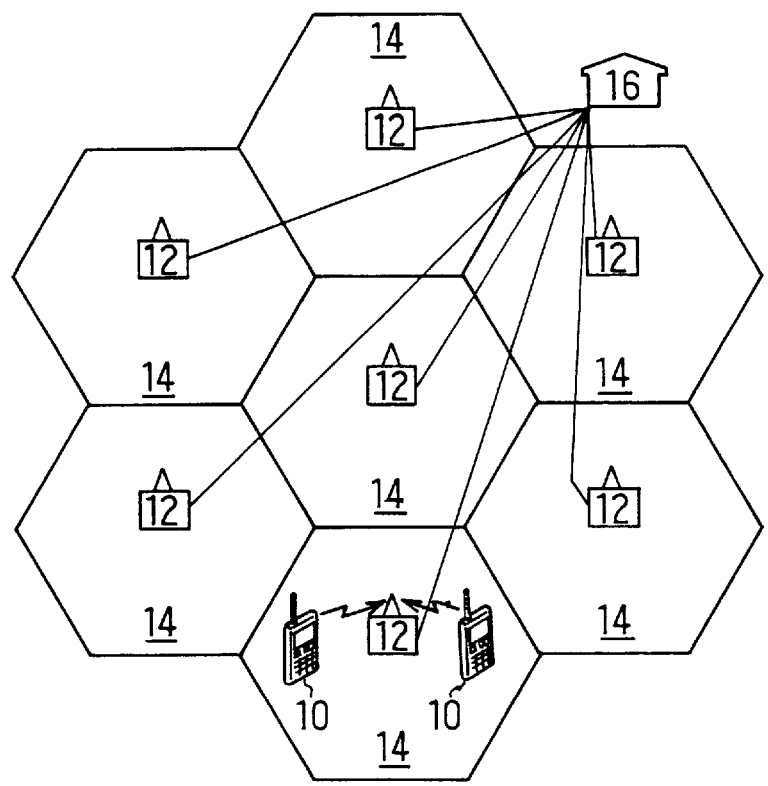
FIG. 1 is a conceptual diagram of a typical portable telephone network according to the prior art.
Figure 3:
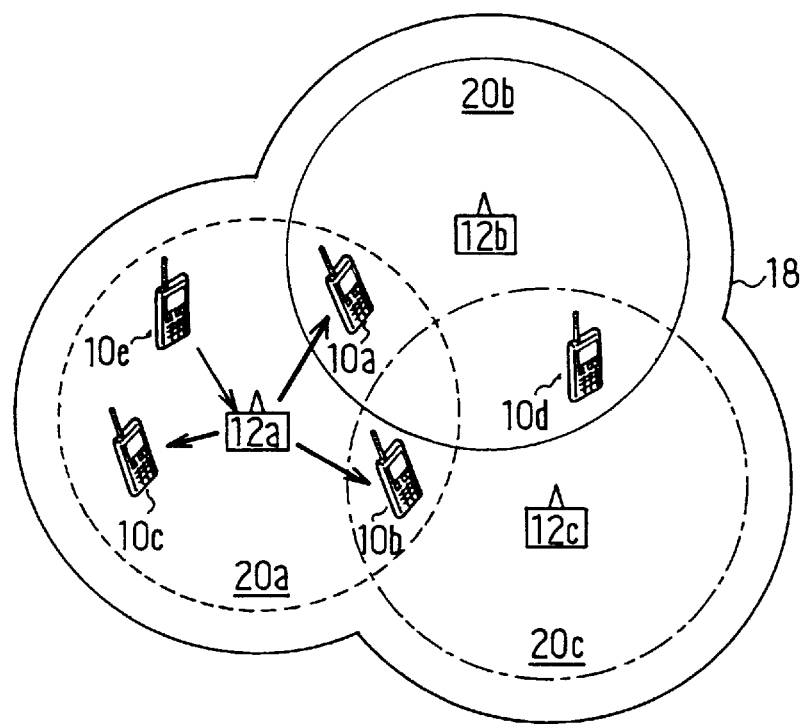
FIGS. 3 and 4 are conceptual diagrams showing call blocking in prior art systems.
Figure 4:
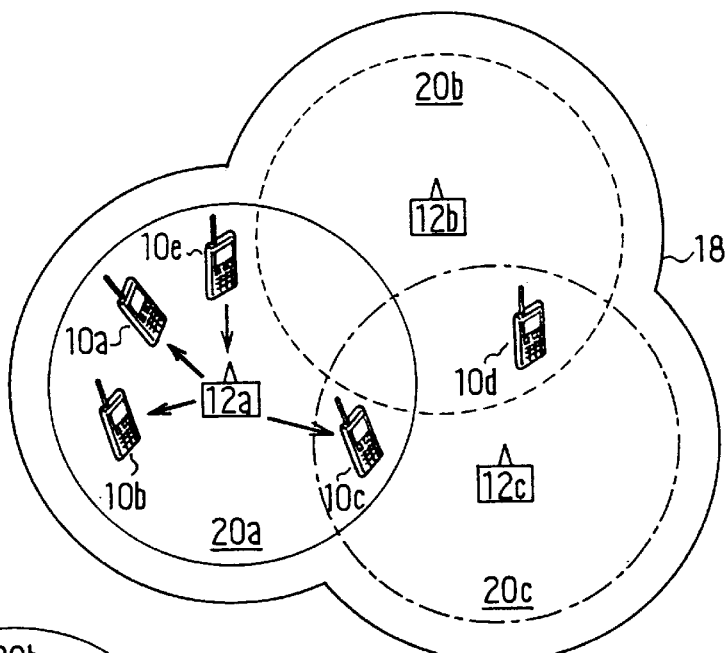
Figure 6:
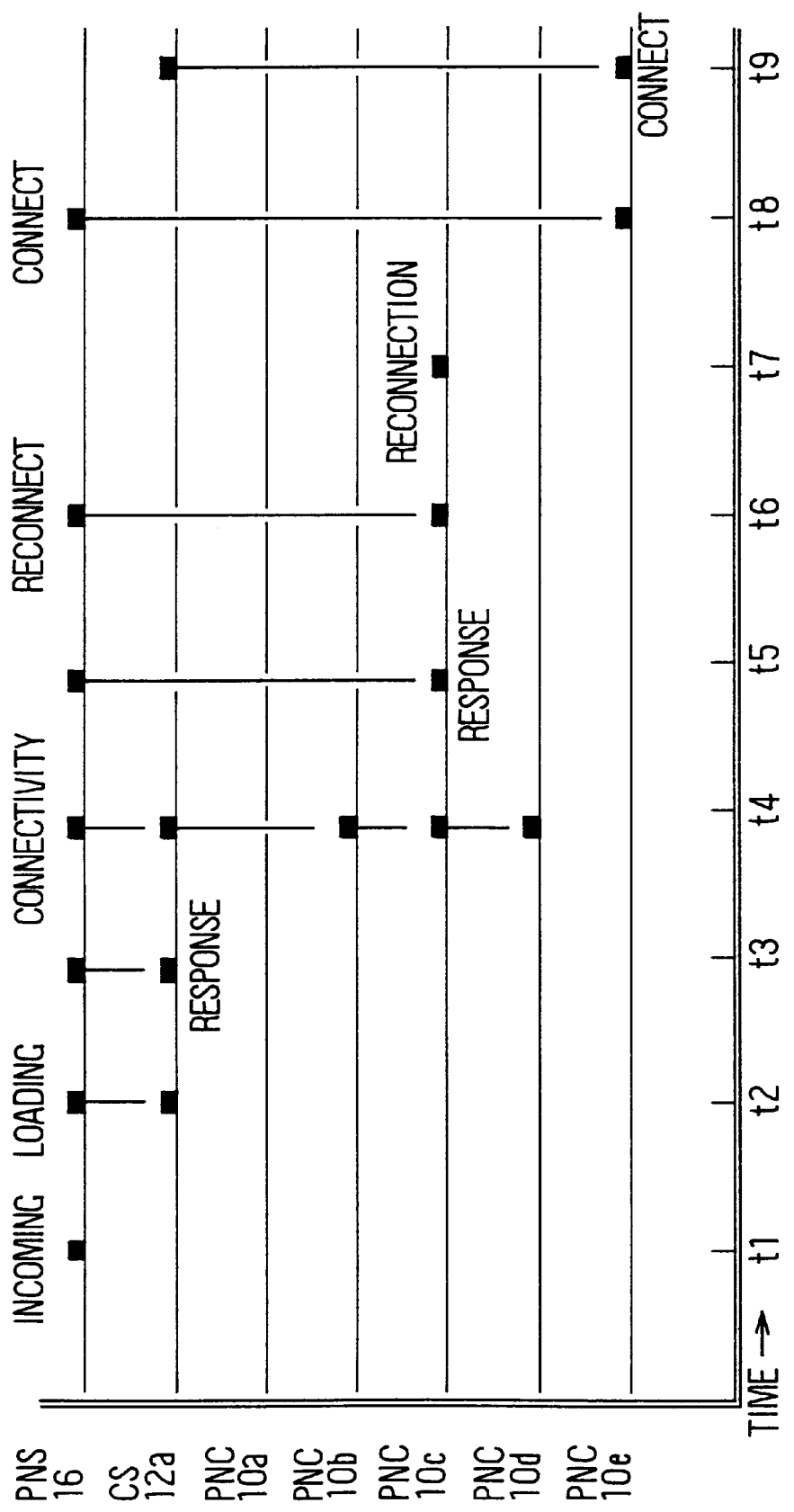
FIG. 6 is a graph showing the sequence of transactions between the PCS controller, cell station and PCS units according to the preferred embodiment.

FIG. 6 shows the transactions between the PNC, cell station and PCS units necessary to accomplish these operations with the arrangement of units in FIG. 4. At time t1, the PNC 16 receives an incoming call from the wireline network, and it sends a loading poll command to the cell station associated with the target PCS unit 10e at time t2. The cell station 12a reports that it is fully loaded at time t3, and at time t4 the PNC sends a connectivity poll command to the PCS units 10a–10c. At time t5, the PCS unit 10c reports to the PNC 16 that it can reconnect. The PNC 16 sends it a reconnect command at time t6, and it obligingly reconnects to cell station 12c at time t7. A voice channel on cell station 12a having been thereby freed, the PNC 16 sends a connect command to the PCS unit 10e at time t8, and the PCS unit 10e connects at time t9 to establish the calling session.

The complementary sequence of events for an outgoing call is almost identical with the exception that at time t1, the PNC 16 receives an outgoing call request from the PCS unit 10e. Also, the sequence of events for handing off a roaming PCS unit are analogous to those for handling an outgoing call request.

Figure 7:
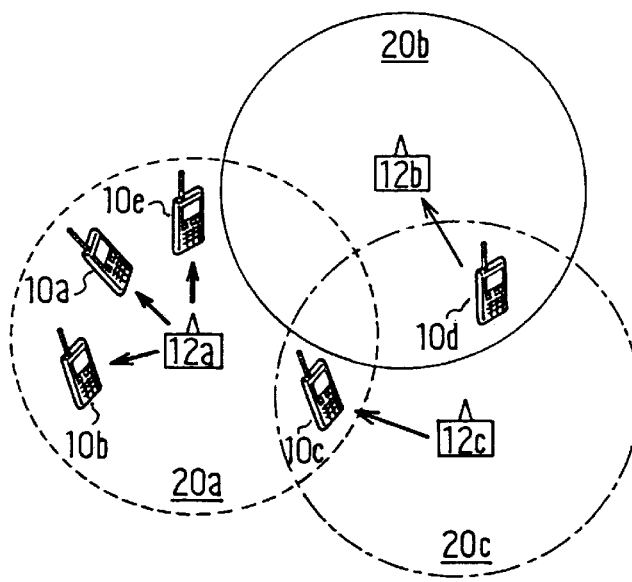
FIG. 7 is a conceptual diagram showing reconnection of PCS units according to the preferred embodiment.

The end result of this process is shown in FIG. 7, where in comparison to FIG. 4 one sees that PCS unit 10e is connected to cell station 12a because PCS unit 10c has reconnected to cell station 12c.

The advantages of the present invention in comparison to the prior art can also be understood in mathematical terms. Assume that the probability of any one of the three PCS units connected to a fully loaded cell station not being reconnectable is $P(R)$. Then, the probability of all three PCS units not being reconnectable is roughly $P(R)^3$ and, conversely, the probability of at least one PCS unit being reconnectable and the additional call therefore not being blocked is about $1-P(R)^3$. Thus, the present invention offers approximately a 1−P(R)³ chance of connecting a call to a fully loaded cell station, whereas prior art systems offer none.

The exact improvement in call connection performance will depend on a number of factors such as RF coverage area patterns, base station density, network traffic characteristics and handset location; however, the above figures are a working approximation, and computer simulations comparing this technique to prior art systems show about a 20–50% increase in performance using the present invention.

To implement the above-described embodiment of the present invention, the PNC, cell stations and PCS units must have additional capabilities not found in prior art systems. For the PNC, these include the ability to issue loading poll commands to cell stations and to analyze responses thereto; the ability to issue connectivity poll commands to PCS units and to analyze responses thereto; and the ability to send reconnect commands to PCS units. For cell stations, these include the ability to respond to loading poll commands and the ability to report PCS unit outgoing call request to the PNC. For the PCS unit, these include the ability to respond to connectivity poll commands and reconnect commands.

Figure 8:
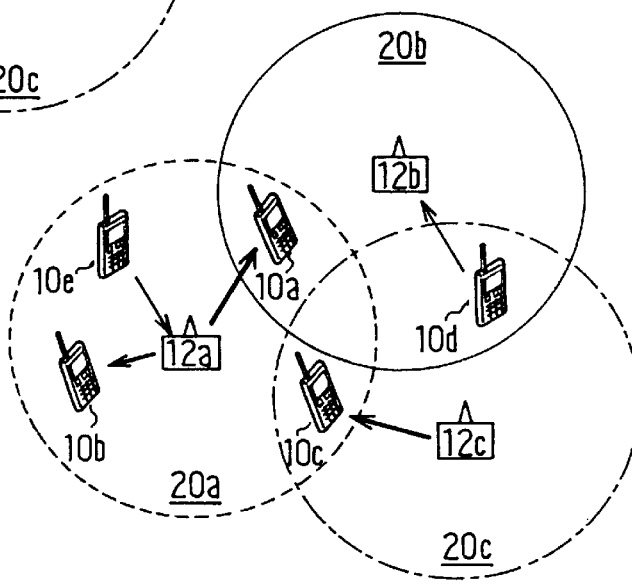
FIG. 8 is a conceptual diagram showing a multiple reconnectability condition according to the preferred embodiment.

The present discussion has dealt only with the situation where one PCS unit indicates that it is reconnectable in Step 156 or Step 164 of FIG. 5. There may be cases, however, where more than one PCS unit is reconnectable. Consider, for example, FIG. 8, where in response to the connectivity poll command from the PNC 16 (not shown in this Figure) in Step 154 or 162, PCS unit 10c would again reply in Step 164 that it is reconnectable (to cell station 12c); however, PCS unit 10a would additionally reply in Step 164 that it is reconnectable (to cell station 12b). In this case, the PNC 16 must make a decision as to which PCS unit, 10a or 10c, should be directed to reconnect. The decision may be based on a number of criteria. For example:

the PCS unit whose reply was received first may be selected;

the PCS unit with the weakest reply signal at the cell station may be selected, since it is probably the farthest away from the cell station and therefore is likely to be handed off soon, anyway;

the PCS unit that has been connected to the cell station for the longest time may be selected, since frequent reconnections of a PCS unit may noticeably degrade the quality of the call from the user's standpoint; and of all cell stations to which the reconnectable PCS units can reconnect, a PCS unit which is reconnectable to the cell station having the lightest present loading is selected, since doing so will minimize the likelihood that reconnection creates yet another fully loaded cell station.

Numerous variations on these criteria are of course possible. For example, in the case of choosing one of two PCS units reconnectable equally lightly loaded cell stations, one of the other criteria may be used as a tiebreaker.

Although the present invention has been fully described in connection with the preferred embodiment thereof with reference to the accompanying drawings, it is to be noted that various changes and modifications will become apparent to those skilled in the art.

For example, the preferred embodiment of the present invention has been described in a PHS environment; however, it may be adapted to other distributed communication systems, such as micro-cellular systems and conventional cellular systems.

Further, in the above-described embodiment, the PNC determines which PCS units are reconnectable in Steps 156 and 164 of FIG. 5 and sends a reconnect command to one of them in Steps 158 and 166, respectively; however, the PCS units need not reply to the PNC as to their reconnectability. Instead, they can simply reconnect to other cell stations, in which case the PNC unit can determine whether any voice channels have been freed up as a result of its connectivity poll command by issuing another loading poll to the cell station as in Steps 140 and 146.

Also in Steps 156 and 164, the PNC may wait for all PCS units registered at the cell station of interest to respond to the connectivity poll command before proceeding; however, it is preferable that the PNC only wait for a predetermined time period and, optionally, accept the first positive reconnectability response before continuing processing. In this way, non-responsive PCS units are deemed to be non-reconnectable; thus, operation of the paging technique according to this embodiment of the present invention is transparent to PCS units which do not have the capability of handling connectivity poll commands and the like.

Also, in this case, a PCS unit which is not reconnectable need not respond to the PNC—it will, by its silence, be deemed to be non-reconnectable, and only reconnectable PNC units need respond to the connectivity poll command.

The present invention has been described only in terms of a single step search for reconnectable PCS units. That is, only the connectivity of PCS units connected to the cell station to which the target PCS unit has registered will be examined. However, the invention is not so limited. For example, assume cell station 12c in FIG. 4 is fully loaded. In such a case, the above-described embodiment would find that there are no reconnectable PCS units in Step 156 or Step 164 and determine that the call is blocked in Step 152. However, since PCS 10c unit is within the coverage zone 20c of cell station 12c, the reconnectability of PCS units connected to cell station 12c might be examined. If one of those PCS units is reconnectable, reconnecting it would free a voice channel on cell station 12c, thereby permitting PCS unit 10c to reconnect and freeing a voice channel on cell station 12a. This would permit connection of the call to PCS unit 10e.

As will be readily apparent, this technique can be extended to any number of steps in order to effect reconnection. As above, various criteria may be used to choose one of several possible candidates for reconnection. Moreover, those skilled in the art will appreciate that heuristic search techniques can be used to find the most optimal reconnection sequence. Optimality of a reconnection sequence may be determined on the basis of, e.g., the number of reconnections involved, loading characteristics of the cell stations involved, etc.

Moreover, the technique need not be used exclusively for redistributing connected calls in fully loaded cell stations. For example, the invention may be used simply to manage overall cell station loading characteristics and maintain relative uniformity of loading in cell stations associated with a particular PNC. In fact, the invention may even be used for selective routing of calls among multiple PNC units. Further, it may be used to see if the target PCS unit, or the PCS unit to which an incoming call is directed, may itself be reconnectable to a different cell station.

In the present invention, if the PNC determines that a cell station is fully loaded when an outgoing call request is made from a PCS unit, the PNC can hand off one of the already-connected PCS units based on cell station loading information collected by each PCS unit and transmitted to the PNC, thereby freeing a channel on the fully loaded cell station for the outgoing call request. These features will now be described in more detail.

Specifically, the PNC initiates the hand-off by requesting a Zone Report from each PCS unit connected through the fully loaded cell station in question. Each PCS unit then generates a respective Zone Report that contains information regarding the connectability of the unit to other cell stations within the particular zone. The PNC then uses the Zone Report to select a PCS unit to hand off to another cell station that is not fully loaded and that, according to the handed-off PCS unit's Zone Report, is capable of establishing a communication link with the handed-off PCS unit. After the PNC causes the PCS unit to be handed off, a channel is freed on the once fully loaded cell station, thereby enabling the PCS unit generating the call request to connect to the cell station.

Regarding the PCS Zone Report, each cell station is required to broadcast system information in a periodic manner within a specified period of time, typically known as a superframe, on a specified channel (frequency) used by PCS units to register with the cell stations, and used for the above-described PCS unit hand-offs. The cell stations broadcast in a time-slotted manner, with a predetermined number of cell stations (for example, 25 stations) in a particular zone sharing the same broadcast channel.

Referring to FIG. 9, based on the above cell station broadcast protocol, each PCS unit generates a Zone Report to indicate cell station broadcast signal levels around the PCS unit to the PNC by performing the following. At 170, the PCS unit tunes to the system broadcast channel. Next, at 172, the PCS unit synchronizes with the start of a cell station broadcast frame.

Consequently, at 174, the PCS unit measures the level (strength) of a cell station broadcast frame, and receives cell station frame information (containing a cell station ID) from the cell station to update a list of the strongest cell station RF reception levels (those cell stations broadcasting a pilot signal at or above a predetermined signal strength). At 176, if the broadcast cycle (superframe) is finished, then every cell station within a zone around the PCS unit has broadcast 1 frame, and the PCS unit generates a Zone Report at 178. If the cycle is not finished, the PCS unit measures the level of the next cell station broadcast frame and receives corresponding cell station frame information at 174 until all cell stations have broadcast frame information and the broadcast cycle has ended.

The above PCS Zone Report/ PNC hand-off features of the present invention will now be described by way of example with reference to FIGS. 10–13.

Figure 10:
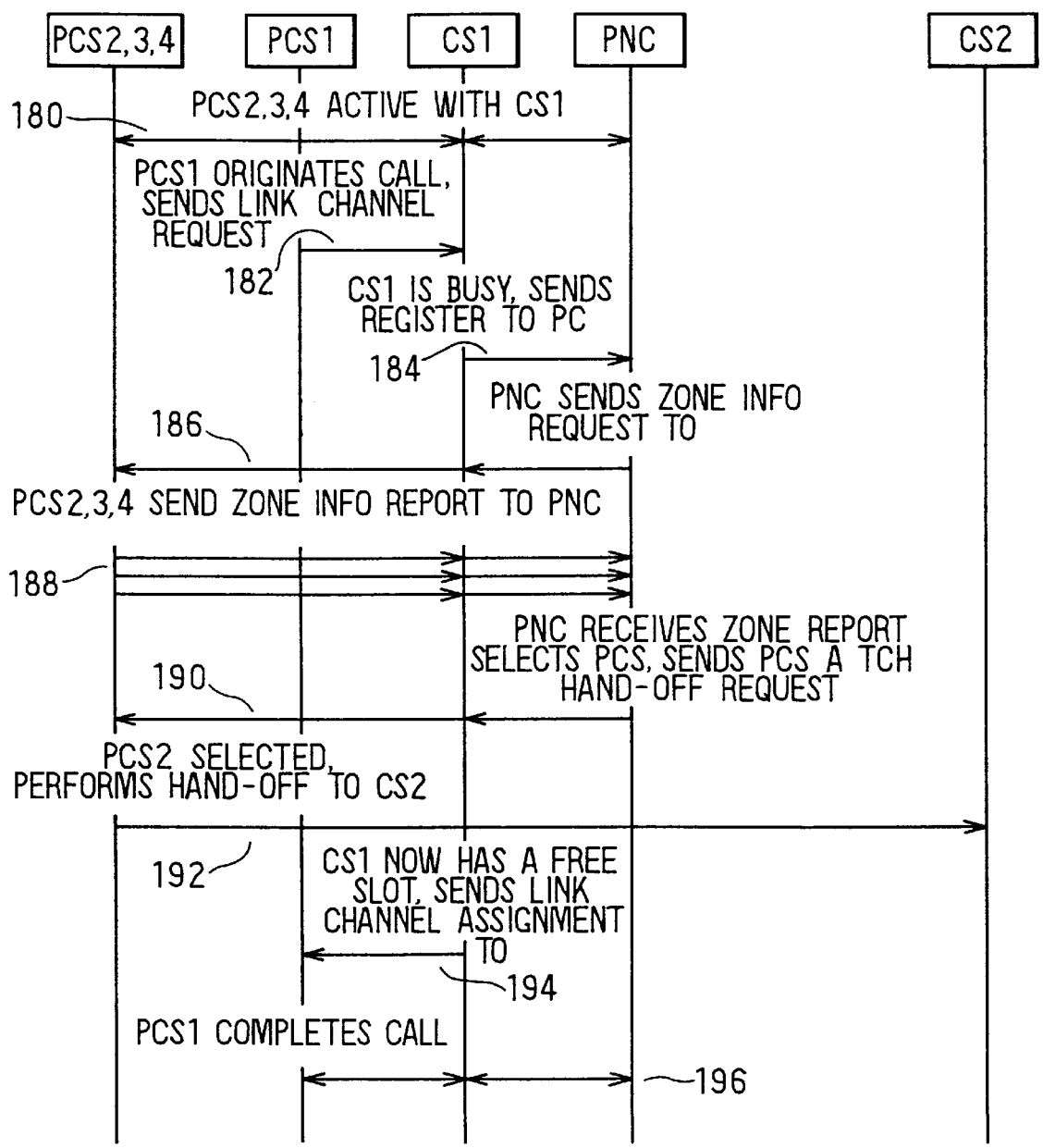
FIG. 10 shows the specific sequence of transactions associated with the zone report/unit hand-off feature of the present invention occurring between the PCS controller, cell station and PCS units during setup of an outgoing call from a PCS unit.

FIG. 10 is a diagram illustrating the above-described communication protocol of the present invention. As shown at 180, PCS units PCS2, PCS3, PCS4 have established links with cell station CS1 when PCS unit PS1 transmits a Link Channel Request to CS1 at 182. For purposes of the present example, it will be assumed that CS1 is fully loaded and therefore has no free channels with which to establish a channel link with PS1. However, it should be appreciated that CS1 would be capable of establishing links with many more than just three PCS units in actual implementation before becoming fully loaded.

At 184, CS1 sends a Register signal to the PHS wireless network controller PNC to inform the PNC of its fully loaded status. In response, the PNC at 186 sends a Zone Report Request to PCS units PCS2, PCS3, PCS4. Each of the units PCS2, PCS3, PCS4 in response queries all cell stations to determine the status (fully loaded or not fully loaded) of each of the cell stations, as previously discussed in connection with FIG. 9.

After making the above query, each PCS unit at 188 sends a Zone Report to the PNC. Based on the information in the respective Zone Reports, at 190, the PNC selects one of the PCS units PCS2, PCS3, PCS4 to hand off to another available cell station within the zone of the selected PCS unit. In the present example, the PNC selects PCS2 based on the respective Zone Reports from PCS2, PCS3 and PCS4. The PNC then at 192 performs a hand-off of PCS2 to a cell station CS2 that has an open channel as determined by PCS2 in response to the PNC's Zone Report Request. Consequently, due to the hand-off of PCS2, a channel is opened at CS1, and at 194 CS1 sends a Link Channel Assignment to PCS1. Upon receiving the Link Channel Assignment, PCS1 completes the call at 196.

Figure 11:
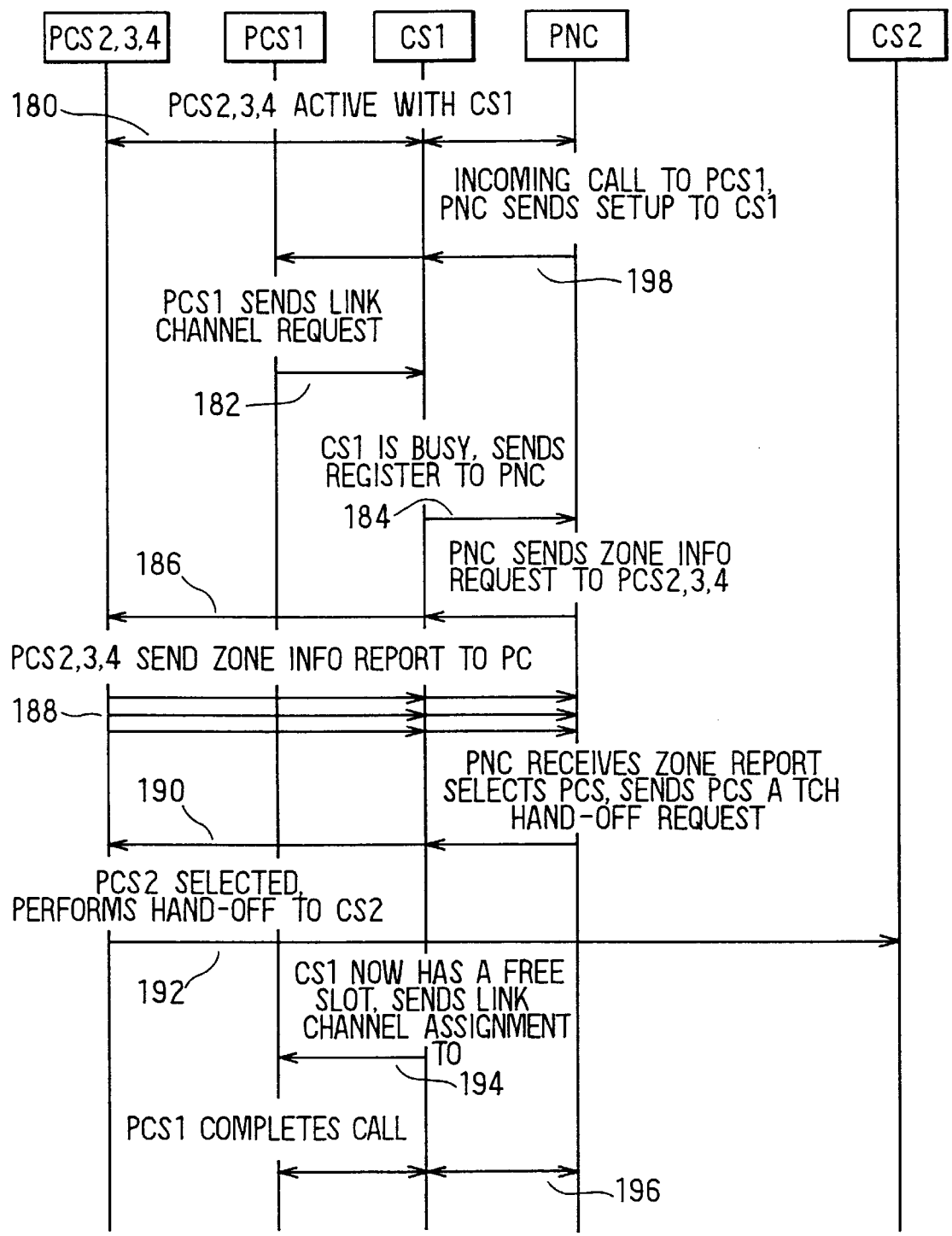
FIG. 11 shows the sequence of transactions associated with the zone report/unit hand-off feature of the present invention occurring during setup of an incoming call to a PCS unit.
Figure 12:
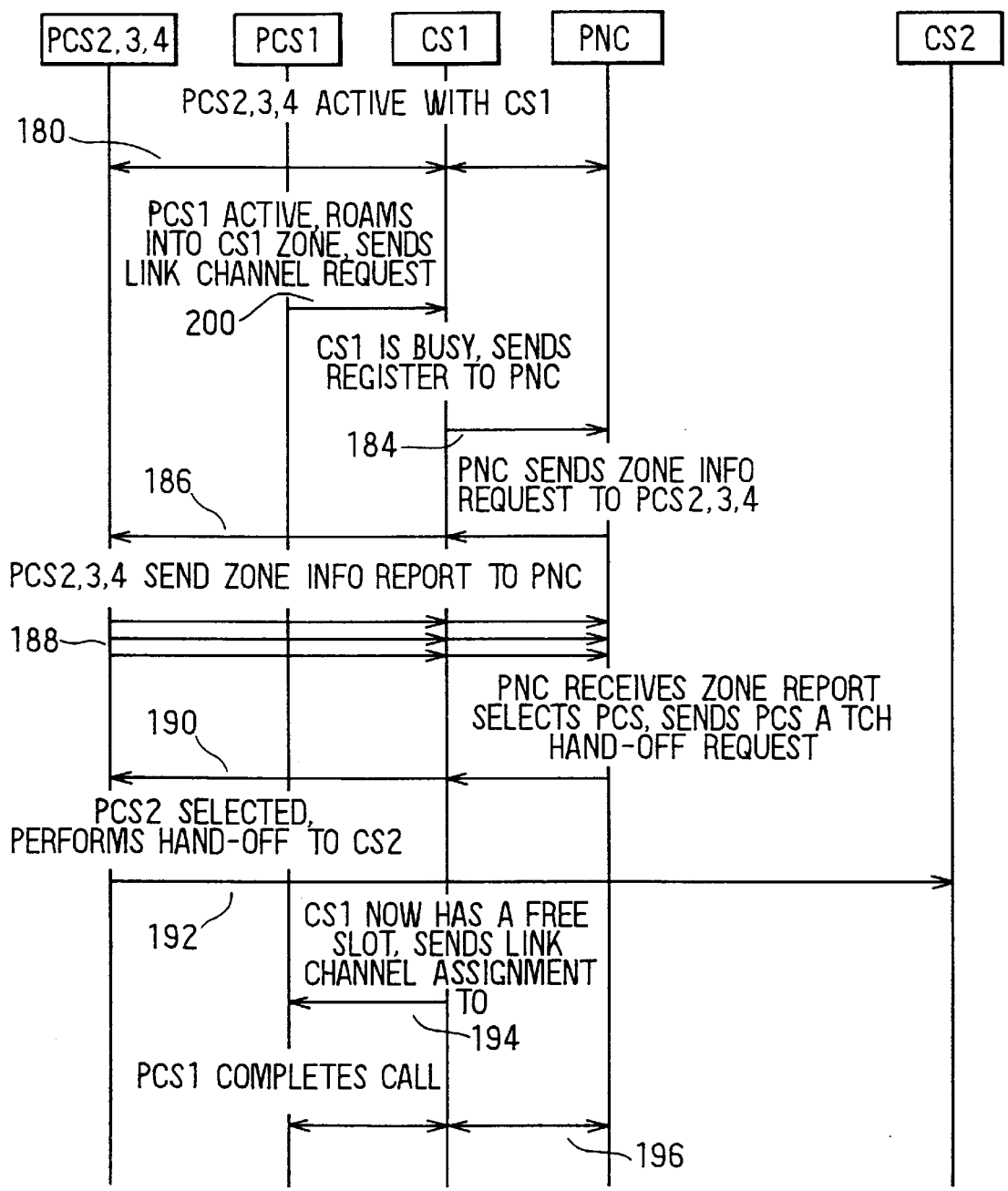
FIG. 12 shows the sequence of transactions associated with the zone report/unit hand-off feature of the present invention occurring during a reconnectability condition occurring during roaming of a PCS unit.

While the above example specifically illustrates a call origination situation in which the PCS unit initiates a call, the PCS unit Zone Report/ PNC hand-off features of the present invention can also be utilized to open channels in fully loaded cell stations in response to incoming calls and in roaming situations. FIGS. 11 and 12 illustrate PCS unit hand-off protocols in response to various situations, with events identical to those shown in FIG. 10 indicated with identical reference numbers. Only those events that differ from those shown in FIG. 10 will be discussed.

More specifically, FIG. 11 illustrates a situation in which an incoming call at 198 is directed to the PCS unit PCS1 through the PNC. In response to the incoming call, the PNC sends a standard SETUP request to CS1, which in turn sends appropriate SETUP information to PCS1. In response to the SETUP information, and as described above in connection with FIG. 10, PCS1 sends a Link Channel Request to CS1 at 182. Subsequent communication protocol is also identical to that shown in FIG. 10.

FIG. 12 illustrates a situation in which the exemplary PCS unit PCS1 has established a communication link with an initial cell station (not shown), and in which PCS1 subsequently roams outside a zone covered by the initial cell station and into a zone covered by CS1. At 200, PCS1, upon roaming into the zone covered by CS1, sends a Link Channel Request to switch from the initial cell station to CS1. At 182, as in FIGS. 10 and 11, when CS1 is fully loaded, CS1 sends a Register Request to PNC. Further communication protocol is identical to that discussed in connection with FIG. 10.

It should be appreciated that the above-described PCS Zone Report/PNC hand-off features of the present invention minimize the occurrence of calls that are dropped due to a fully loaded cell station. A call will only be dropped if a PCS unit from which a call is made, or to which a call is directed, cannot connect to a fully loaded target cell station, and Zone Reports from all PCS units connected to the target cell station indicate that all alternative cell stations within a communication range of each particular PCS unit are also fully loaded. However, the occurrence of dropped calls can be further reduced through implementation of one or more of the following measures.

Figure 13:
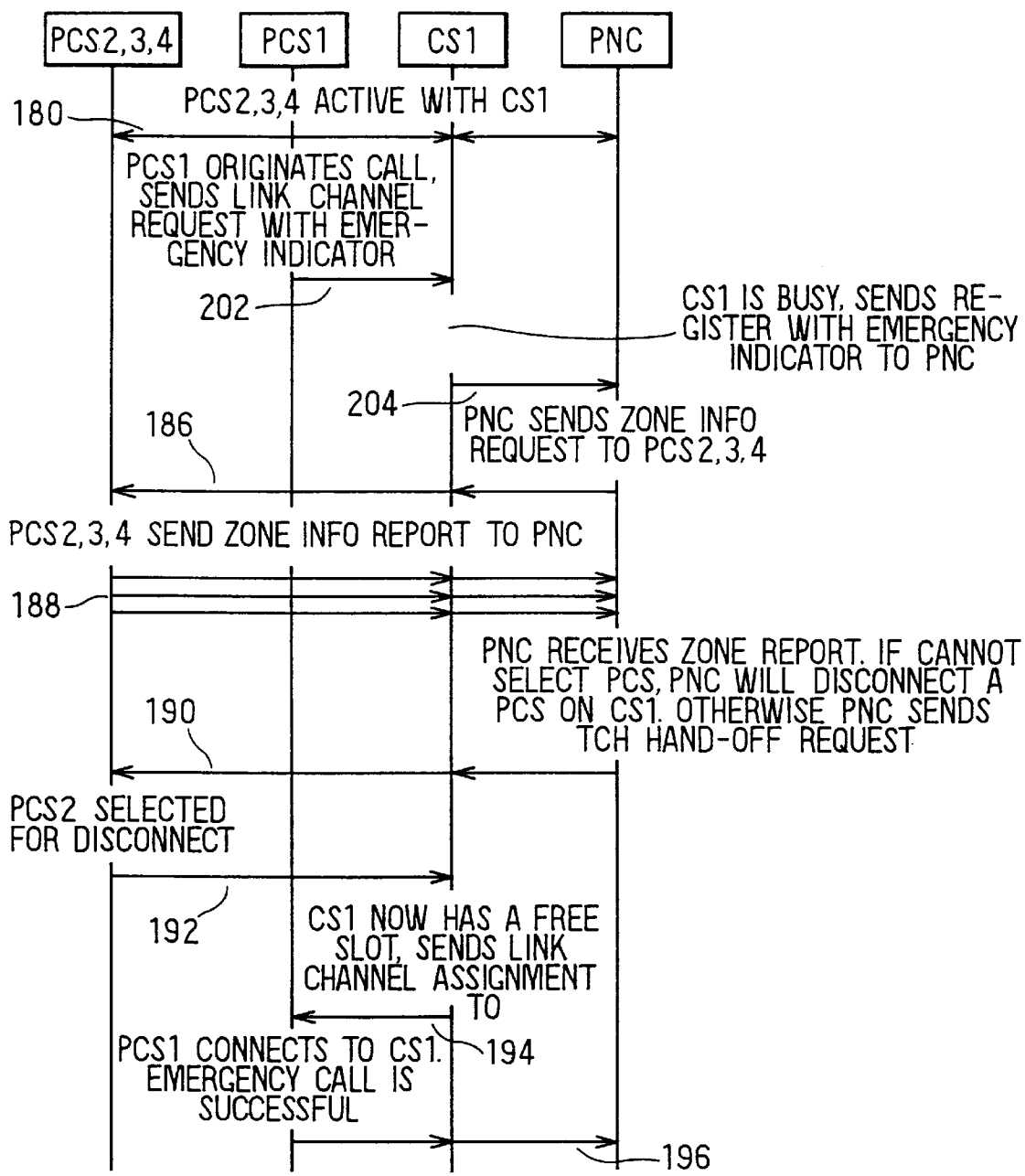
FIG. 13 shows a sequence of transactions associated with the zone report/unit hand-off feature of the present invention occurring during setup of an outgoing call with an emergency indicator.

FIG. 13 illustrates a situation in which an emergency call is placed via PCS1. At 202, a call is initiated at PCS1 when a Link Channel Request is sent from PCS1 to CS1. CS1, when busy, then sends a Register to the PNC at 204. However, the Link Channel Request and the Register differ from the above-discussed Link Channel Requests and Register signals in that both include an emergency indicator. Typically, the emergency indicator is in the form of a 911 (United States) or 119 (Japan) telephone number; however, the emergency indicator can be in any service provider-designated format.

Subsequent communication protocol is identical to that described above; however, when the PNC receives respective Zone Reports from PCS2, PCS3 and PCS4, if the PNC cannot select a PCS to hand off (in other words, each PCS reports that all cell stations capable of establishing a channel link with the PCS are fully loaded), the PNC will disconnect one of the PCS units from CS1. The PNC selects the PCS unit to be disconnected (PCS2) based on predetermined call parameters such as those previously discussed above.

For example, the PNC may be programmed to disconnect the PCS unit that has been connected thereto for the longest, or the shortest, amount of time; that was the first to reply to the PNC's Zone Report Request; or that has the weakest reply signal. Therefore, a call with an emergency indicator will be automatically connected regardless of whether PCS units connected to fully loaded CS1 can or cannot be handed off.

As with the above-described emergency call situation, the present invention is also capable of implementing a priority PCS feature. Calls placed from and/or sent to a PCS unit having the priority feature would be identified with a priority PCS indicator that would be part of the subscriber service profile. The priority PCS feature, which utilizes the same protocol as shown in FIG. 11, ensures feature subscribers that their calls will receive channel link priority, thereby ensuring automatic connection of every call, regardless of the amount of call traffic within the particular call zone.

In addition, the above-described hand-off communication protocol of the present invention may also be used to dynamically manage overall system PCS traffic. Such a feature enables the PNC to reassign active PCS units to other cell stations, based on information from the PCS unit Zone Reports, at any time based on predetermined cell station loading optimization parameters. The dynamic PCS traffic management feature is capable of ensuring that cell stations will always have a free traffic channel, thereby further minimizing the occurrence of dropped and disconnected calls.

Further, the PCS unit-generated Zone Reports may also be used to identify the location of each PCS unit within a particular zone, in addition to indicating the loading status of cell stations within the communication range of the PCS unit. Such a feature may be utilized in conjunction with a cell station loading management program, such as the dynamic traffic management feature discussed above to further enhance overall system operation by further minimizing the occurrence of unsuccessful and disconnected calls by optimizing cell station loading.

Finally, it should be appreciated that the PCS unit zone-reporting feature may be modified in any one of several ways. For example, each PCS unit, while typically transmitting information on all cell stations within its range of communication, may instead optionally transmit information in its Zone Report only regarding cell stations that are not fully loaded. If all cell stations are fully loaded, each PCS unit may optionally transmit an ALL TRAFFIC CHANNELS OCCUPIED message to the PNC. In addition, each PCS unit may alternatively abort a cell station detection cycle as soon as a predetermined number of cell stations are measured on its reception level list to thereby optimize PCS unit response time. Further, each PCS unit may be programmed so as not to send a response to the PNC if no cell station is available for connection to the PCS unit via hand-off.

Such changes and modifications are to be understood as being included within the scope of the present invention as defined by the appended claims.

What is claimed is:

1. A distributed communication system paging method, comprising:

receiving a call connection request;

determining whether a cell station through which said call connection request is to be routed is fully loaded;

when said cell station is determined to be fully loaded, reconnecting a reconnectable portable unit having a call connected through said cell station to a different cell station; and connecting a call through said cell station responsive to said call connection request;

said reconnecting step comprising sending a connectivity poll command to portable units having calls connected through said cell station, and receiving a zone report from each of said portable units in response thereto, said reconnectable portable unit being one of said portable units having calls connected through said cell station, and being chosen to be reconnected based on its zone report.

2. The method of claim 1, wherein said call connection request is an incoming call request from a wireline network.

3. The method of claim 1, wherein said call connection request is an outgoing call request from a portable unit registered with said cell station.

4. The method of claim 1, wherein said call connection request is a hand-off of a roaming portable unit.

5. The method of claim 1, wherein said determining step comprises the steps of:

issuing a loading poll command to said cell station; and determining whether a response from said cell station indicates that said cell station is fully loaded.

6. The method of claim 1, wherein said zone report received from each of said portable units during said reconnecting step indicates other cell stations with which each of said portable units is capable of establishing an alternate communication link.

7. The method of claim 1, wherein said reconnecting step further comprises the steps of:

receiving a response from said reconnectable portable unit which indicates that said reconnectable portable unit can connect to a different cell station; and sending said reconnectable portable unit a reconnect command to cause said reconnectable portable unit to reconnect to said different cell station.

8. A personal communication system network controller comprising:

call connection request receiving means for receiving a call connection request;

cell station loading monitoring means for determining loading of a cell station through which a call corresponding to said call connection request is to be connected;

portable unit connectivity monitoring means for determining connectivity of portable units having calls connected through said cell station; and reconnection means for directing reconnection of a reconnectable portable unit determined by said portable unit connectivity monitoring means to be reconnectable to a different cell station;

wherein said reconnection means comprises connectivity poll command sending means for sending a connectivity poll command to portable units having calls connected through said cell station, and receiving a zone report from each of said portable units, said reconnectable portable unit being one of said portable units having calls connected through said cell station, and being chosen based on its zone report.

9. The system network controller of claim 8, wherein said cell station loading monitoring means comprises:

loading poll command issuing means for issuing a loading poll command to said cell station; and response determination means for determining whether a response from said cell station indicates that said cell station is fully loaded.

10. The system network controller of claim 8, wherein said zone report received from each of said portable units indicates other cell stations with which each of said portable units is capable of establishing an alternate communication link.

11. The system network controller of claim 8, wherein said reconnection means further comprises:

connectivity response receiving means for receiving a response from said reconnectable portable unit which indicates that said reconnectable portable unit can connect to a different cell station; and reconnect command sending means for sending said reconnectable portable unit a reconnect command to cause said reconnectable portable unit to reconnect to said different cell station.

12. A cell station for a cellular telephone system, said station comprising:

call connection means for establishing a telephone call between a PCS unit and a PCS network controller;

call connection request receiving means for receiving a call connection request from said PCS unit; and call connection request sending means for notifying said PCS network controller of receipt of said call connection request;

loading poll command receiving means for receiving a loading poll command signal from said PCS network controller; and loading poll transmitting means for transmitting a loading response signal to said PCS network controller based on zone reports received from connected PCS units.

13. A personal communication system comprising:

a network controller;

a plurality of cell stations connected to said network controller; and a plurality of portable phones each connectable to one of said cell stations;

wherein said network controller is for monitoring connection states between said cell stations and said portable phones to control the connection states thereof and for intermediating incoming calls, outgoing calls, and roaming connection requests through the cell stations and said portable phones, said network controller providing, through a given cell station, a reconnect message to each portable phone connected to said given cell station when said given cell station is fully loaded and connection is requested thereto by a portable phone presently unconnected thereto, by polling said each portable phone for reconnection determination purposes, and;

said plurality of cell stations are each for connecting to the portable phones via wireless links, transmitting connection requests from the portable phones to the network controller, and reconnecting the portable phones responsive to reception of a reconnect message from said network controller; and said plurality of portable phones are each for providing a connection request to cell stations to which said phone is communicable other than a cell station to which said phone is presently connected, and for reconnecting to one of said cell stations which is connectable to reduce the full loading of the cell station to which said phone is presently connected when said portable phone generates a report indicative of its reconnectability to at least one of said cell stations, and as a result receives said reconnect message.

14. The system of claim 13, wherein each of said plurality of cell stations is connected to said network controller via a wired ISDN line.

15. The system of claim 13, wherein:

each of said cell stations is connectable to a limited number of portable phones;

each of said portable phones is further for requesting connection to a fully loaded cell station when said phone cannot connect to any other cell station; and said network controller includes means for reconnecting a portable phone connected to said fully loaded cell station to another cell station so that said portable phone which cannot connect to any other cell station can connect to said fully loaded cell station.

16. The system of claim 15, wherein said portable phone which cannot connect to any other cell station is a roaming portable phone to be connected to the full loaded cell station.

17. The system of claim 13, wherein said network controller includes means for providing a reconnect message to portable phones connected to a fully loaded cell station responsive to an incoming call from said external network for a portable phone connectable to said fully loaded cell.

18. The method of claim 1, further comprising the step of selecting said reconnectable portable unit based on call durations associated with each of said portable units having calls connected through said cell station.

19. The controller of claim 8, wherein said reconnection means directs reconnection of said reconnectable portable unit based on a length of time the reconnectable portable unit has been connected to said cell station.

20. The system of claim 13, wherein said plurality of portable phones are further for reconnecting to one of said cell stations based on a call duration associated with each of said plurality of portable phones.

21. The method of claim 1, further comprising automatically dropping a call connected through the fully loaded cell station when the call includes a priority indicator.

22. The method of claim 21, wherein the automatic dropping of a call connected through the fully loaded cell station is based on a predetermined call parameter.

23. A method of managing cell station loading in a distributed communication system, comprising:

checking loading of at least one cell station within a communication zone;

determining whether the at least one cell station is fully loaded;

when the at least one cell station is determined to be fully loaded, sending a connectivity poll command to all portable units having calls connected through the cell station;

receiving a zone information report from each of the portable units in response thereto; and reconnecting a reconnectable portable unit having a call connected through the cell station to a different cell station, the reconnectable portable unit being chosen based on its zone information report.

24. The method of claim 23, wherein the checking loading of at least one cell station within a communication zone is performed periodically to dynamically manage loading of all cell stations within the communication zone to maintain the cell stations at a less than fully loaded status.

25. The method of claim 23, further comprising identifying a location of all portable units within the communication zone through respective zone reports from each of the portable units.

26. A personal communications system portable unit cell station query method, comprising:

receiving a zone report request;

tuning to a system broadcast channel;

synchronizing with a start of a broadcast frame of a cell station;

determining parameters of the broadcast frame;

repeating the synchronizing and determining for subsequent broadcasting cell stations; and generating a zone report when all cell stations broadcasting on the system broadcast zone have broadcast frame information.

27. The method of claim 26, wherein the determining parameters of the broadcast frame comprises determining a broadcast level of the cell station, and receiving cell station identifying information from the cell station.

28. The method of claim 26, wherein the repeating of the synchronizing and determining for subsequent broadcasting cell stations is performed only for a predetermined number of cell stations.

* * * * *